United States Patent [19]
Terai et al.

[11] 3,836,748
[45] Sept. 17, 1974

[54] PROCESS OF WELDING A HIGH TENSION STEEL
[75] Inventors: Kiyoshi Terai; Isao Masumoto, both of Kobe, Japan
[73] Assignee: Kawasaki Jukogyo Kabushiki Kaisha, Kobe-shi, Hyogo, Japan
[22] Filed: Mar. 20, 1973
[21] Appl. No.: 343,088

Related U.S. Application Data
[63] Continuation-in-part of Ser. No. 144,206, May 17, 1971, abandoned.

[52] U.S. Cl.................................. 219/137, 219/75
[51] Int. Cl............................ B23k 9/00, B23k 9/16
[58] Field of Search........................ 219/137, 74, 75

[56] References Cited
UNITED STATES PATENTS
3,217,132  11/1965  Schillinger............................ 219/74
3,288,981  11/1966  Mabry et al. ........................ 219/137
3,660,629  5/1972  Nakai et al. ........................... 219/73

FOREIGN PATENTS OR APPLICATIONS
249,183  1/1961  Australia............................. 219/137

Primary Examiner—J. V. Truhe
Assistant Examiner—Gale R. Peterson
Attorney, Agent, or Firm—Sughrue, Rothwell, Zinn, & Macpeak

[57] ABSTRACT

A process of welding a high tension steel comprising welding said high tension steel by the Metal-arc-Inert-Gas welding method with an electrode by which a metastable austenitic steel weld metal is obtained and, thereafter, subjecting said welded high tension steel to (1) a sub-zero cooling to transform the austenitic steel into martensitic steel and (2) an aging treatment at a temperature and for a period of time sufficient to improve the tensile strength and yield strength of the product.

8 Claims, 7 Drawing Figures

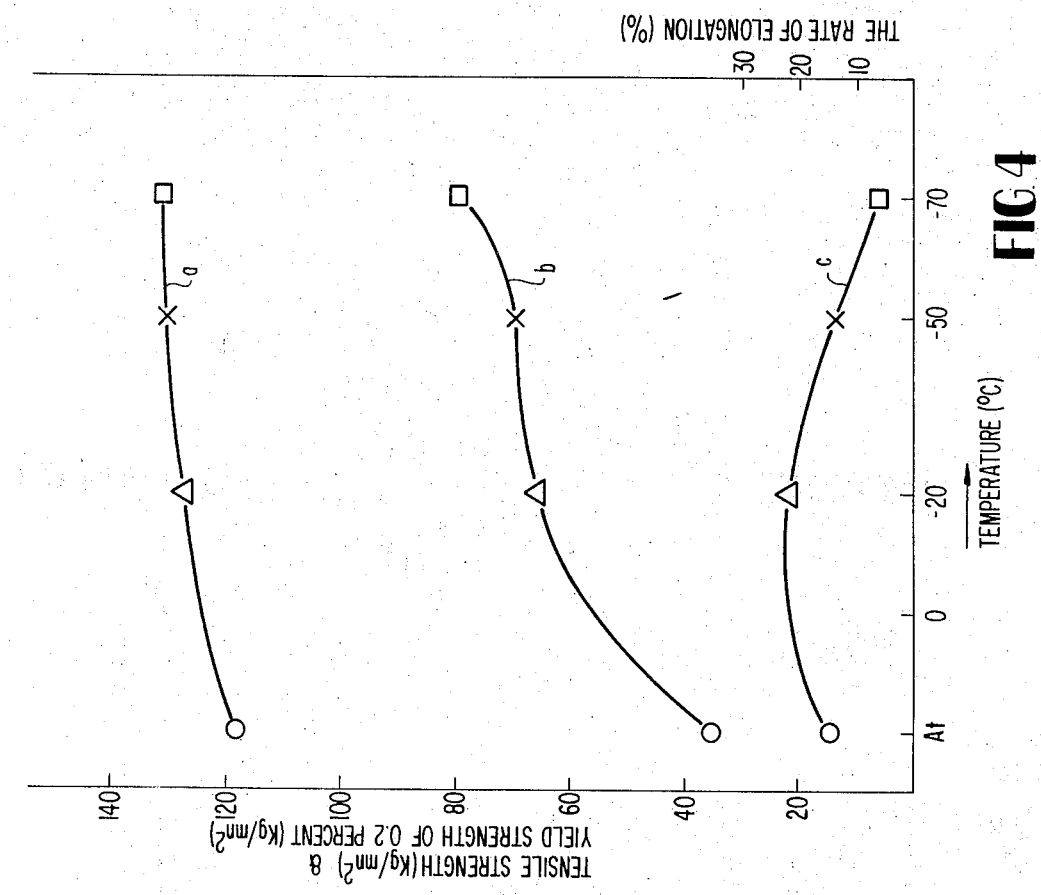
FIG. 4
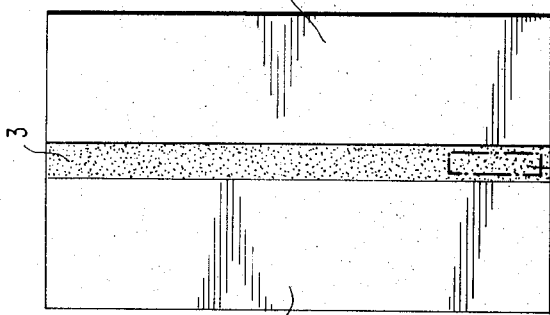
FIG. 1A
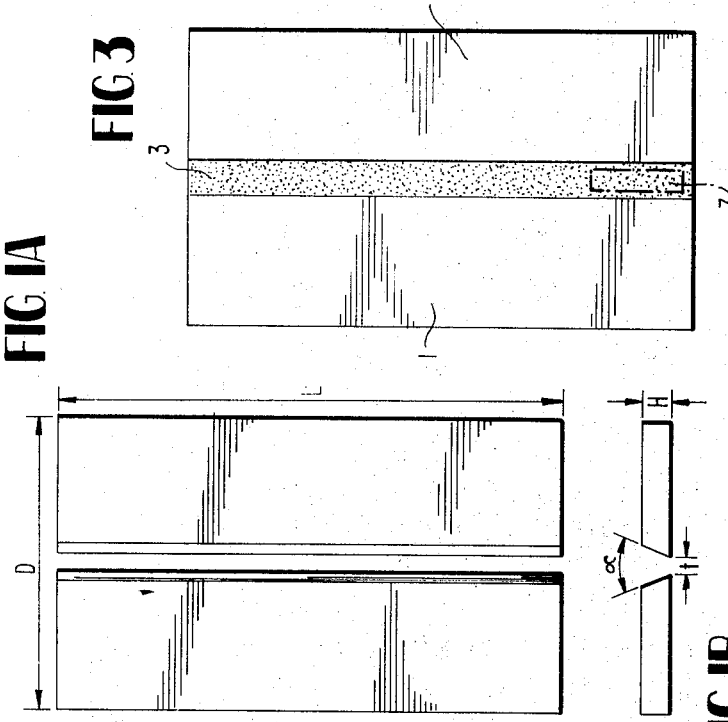
FIG. 1B
FIG. 3
FIG. 2
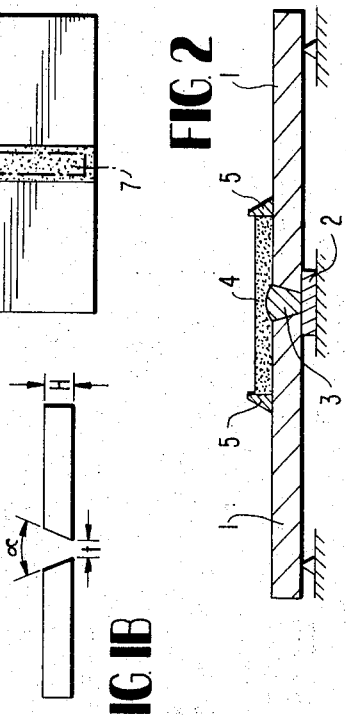
FIG. 5

3,836,748

PROCESS OF WELDING A HIGH TENSION STEEL

CROSS-REFERENCE TO RELATED APPLICATION

The present application is a Continuation-In-Part Application of U.S. application Ser. No. 144,206, filed May 17, 1971 for "A Process of Welding a High Tension Steel," now abandoned.

BACKGROUND OF THE INVENTION

1. Field of the Invention

The present invention relates to a process of welding a high tension steel; more particularly, useing the M.I.G. (Metal-arc-Inert-Gas) welding method employing an electrode by which a metastable austenitic steel weld is obtained and, after welding, subjecting the welded steel to sub-zero cooling and aging treatments.

2. Description of the Prior Art

Heretofore, in the case of welding a high tension steel having a tensile strength of at least 80 kg./mm$^2$, it has been known that the base metal being welded softens if the speed of welding is slow. On the other hand, if the speed of welding is fast, cracks occur at the heat-affected portion of the base metal during cooling because the heat-affected portion cools rapidly.

The present invention obviates the above disadvantages (which are contradictory) by one simple process.

It is, therefore, one object of the present invention to provide a process of welding a high tension steel advantageously without softening or crack formation at the heat-affected portion of the welded metal.

Further objects, features and advantages of the present invention will become apparent from the following description taken in conjunction with the accompanying drawings.

SUMMARY OF THE INVENTION

The present invention achieves the above objects by providing a process for welding a high tension (i.e., greater than 80 kg./mm$^2$) steel comprising welding the steel by the Metal-arc-Inert-Gas welding method using an electrode by which a metastable austenitic weld metal is obtained and, after welding, subjecting the welded steel to (1) a sub-zero cooling treatment (below 0°C.) to transform the austenitic steel into a martensitic steel and (2) an aging treatment to improve the yield and tensile strengths of the product.

BRIEF DESCRIPTION OF THE DRAWINGS

FIG. 1A is a plan view of a base metal being welded;

FIG. 1B is an elevational view of the base metal illustrated in FIG. 1A;

FIG. 2 is an elevational sectional view illustrating one embodiment of the sub-zero cooling of the present invention;

FIG. 3 is a plan view of the base metal plate which was subjected, in turn, to the welding, sub-zero cooling and aging treatments of the present invention;

FIG. 4 is a graph comparing the results of tension tests on the welded metal piece obtained without the sub-zero cooling and aging treatments with the results of the same tension tests of three welded metal pieces obtained by the process of the present invention;

FIG. 5 is an elevational view of the test piece used in the tension tests; and

DETAILED DESCRIPTION OF THE PREFERRED EMBODIMENTS

Figure 6:
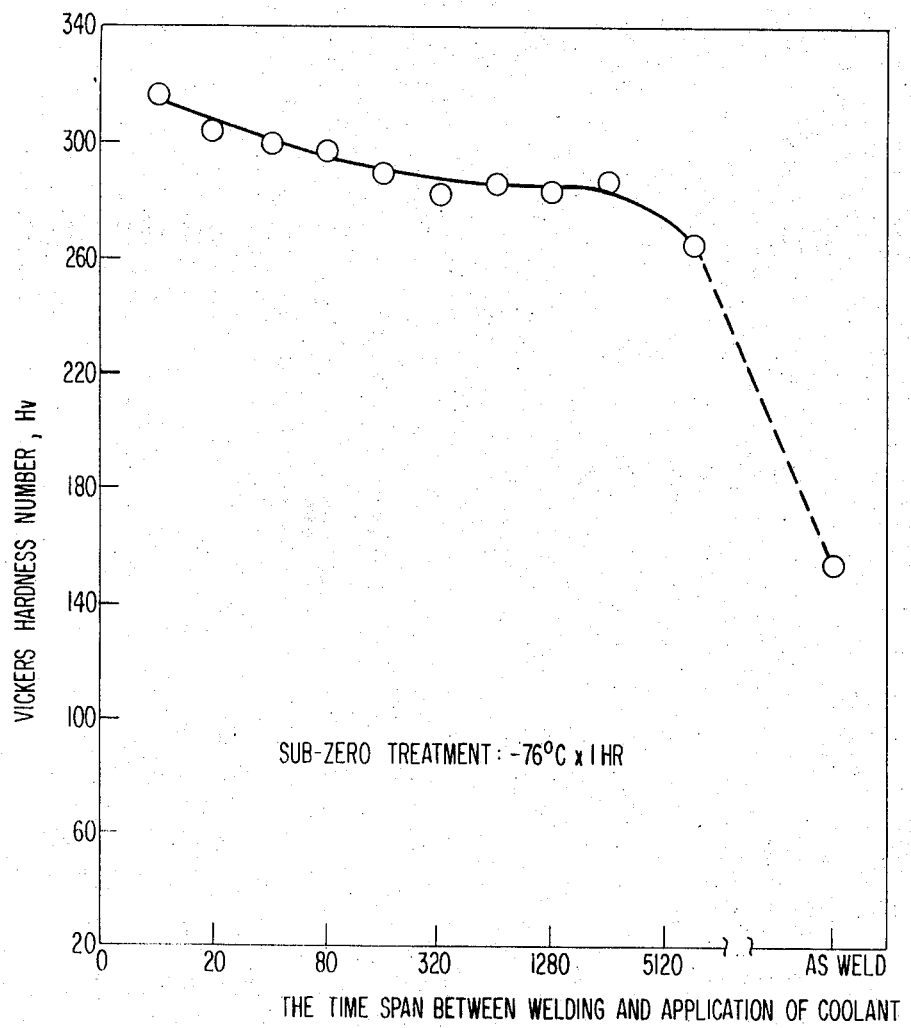
FIG. 6 shows the relationship between (1) the time span between cessation of welding and initiation of the sub-zero cooling, and (2) the hardness of the welded metal.

Generally speaking, for preventing the enlargement of a softening zone in the base metal and for performing a good weld efficiently, a high speed welding method is a suitable method of welding a high tension steel.

However, high speed welding also invites the occurrence of cracks at the heat-affected zone of the base metal because the heat-affected zone is cooled rapidly since the total amount of heat absorbed by the weld is low.

In such a case, if an electrode having superior ductility coated with an austenitic steel is used in place of a conventional electrode coated with a ferritic steel, the occurrence of cracks at the heat-affected zone is prevented because the binding force which acts on the heat-affected zone is reduced. However, it is an unsolved problem that the yield point of the resulting welded austenitic steel decreases.

For the purpose of solving that problem and performing the aforesaid objects of the present invention, the present invention uses an electrode by which a metastable austenitic steel weld metal is obtained. The reasons why the problems of the prior art are overcome are that the metastable austenitic steel is transformed into a martensitic steel by subjecting it to sub-zero cooling after welding and further said martensitic steel is transformed into a precipitation hardened-type martensitic steel having a low carbon content by an aging step.

As the result of this, the welded metal of the present invention has a high yield point and yet a good ductility and tenacity.

Generally speaking, the electrode employed in the process of the present invention has a composition by which a metastable austenitic weld metal is obtained. More specifically, the composition of the electrode is as follows: 0.005–0.07 weight % carbon, 0.20–0.9 weight % silicon, 1.5–6.0 weight % manganese, 14.0–26.0 weight % chrome, 6.0–12.0 weight % nickel, 1.3–3.5 weight % molybdenum, 1.3–3.5 weight % cobalt and 1.3–1.8 weight % copper, balance iron.

The Metal-arc-Inert-Gas welding method is a well-known process and the conditions of welding vary widely depending on the base metal and electrode employed. Generally, suitable conditions are as follows:

| | |
|---|---|
| Welding Current: | 420 – 430 AMP |
| Welding Voltage: | 28 – 29 Volts |
| Welding Velocity: | 20 – 25 cm/min. |
| Gas Composition/Amount: | Argon: 15–20 Liters/min. |
| | $CO_2$: 1–5 Liters/min. |

Any kind of steel composition is operable for use as the base metal.

After welding, the steel is permitted to cool to room temperature. Depending upon the hardness desired, the time interval between the cessation of welding and initiation of the sub-zero treatment will vary. Referring to FIG. 6, the relationship between hardness and this time interval is shown. For the purposes of the present invention, a desirable result can be obtained if one waits from 20 to 320 minutes after welding to begin the sub-zero treatment. This time can, of course, be varied depending upon the results desired.

The sub-zero treatment is conducted by contacting the weld metal with any suitable coolant. The particular coolant used is not critical, and examples are dry ice; mixtures of dry ice with methyl or ethyl alcohol; liquid nitrogen; mixtures of liquid nitrogen with methyl or ethyl alcohol, etc. Generally, the temperature need only be lower than 0°C., but it is preferred that the temperature be within the range −20° to −196°C, for a period of time sufficient to transform the austenitic weld metal into martensitic steel, usually for 10–320 minutes.

Following the sub-zero cooling, the welded steel is permitted to slowly regain room temperature over a period of time which is not critical. Generally, the time should be slow enough to prevent crack formation. Upon reaching room temperature, the welded steel is then subjected to an aging treatment at a temperature and for a time necessary to transform the martensitic steel weld metal into a precipitation-hardened martensitic steel (thus improving the tensile strength and yield strength thereof). Generally, the temperature varies from 350° to 500°C, and the time from 30 to 120 minutes, although these conditions can be varied by one skilled in the art depending on the strength desired. Thus, by simple testing, one can emperically determine how long and at what temperature the aging treatment should be conducted.

After aging, the resulting welded steel is slowly cooled to room temperature in the atmosphere.

EXAMPLE

The present example is one embodiment of the present invention.

The shape of base metal (1) is as shown in FIGS. 1A and 1B and the dimension of each part is as shown in the following Table 1, the composition of which is shown in Table 2.

Table 1

| | |
|---|---|
| L: The welding length | 440 (mm) |
| t: The bottom distance | 3 (mm) |
| H: The welding height | 12 (mm) |
| : The included angle (α) | 45° |
| D: The total width of the base metal | 250 (mm) |

Table 2

| | | | | | | | | (Weight %) |
|---|---|---|---|---|---|---|---|---|
| | C | Si | Mn | Cr | Ni | Mo | Co | Cu | Fe |
| HT80 | 0.16 | 0.31 | 0.99 | 0.55 | 1.08 | 0.73 | 0.30 | 0.05 | Balance |

N.B. "HT80" indicates HT80 steel which is high tensile steel having a tensile strength of 80–85 Kg/cm².

In the present example, four sets of the above-mentioned base metal in the same shape and the same dimension were prepared and they were each welded using an electrode by which a metastable austenitic steel weld metal was obtained, the composition of which is shown in the following Table 3, according to the Metal-arc-Inert-Gas welding method under the following conditions, in which:

| | |
|---|---|
| Welding Current: | 420 AMP. |
| Welding Voltage: | 28 V. |
| Welding Velocity: | 22.5 cm/min. |
| Composition of gas supplied: | Argon + $CO_2$ |
| Amount of gas supplied: | Argon: 18 L/min. |
| | $CO_2$: 2 L/min. |

One of the base metals welded by the above method was not treated further while the other three were subjected to sub-zero cooling at −20°C., −50°C. and −70°C., respectively, for one hour in the state shown in FIG. 2. The time interval between welding and the sub-zero cooling was 50 minutes for all three samples and the time required for the three samples to again reach room temperature after cooling was 5 hours.

Table 3

| | | | | | | | | (Weight %) |
|---|---|---|---|---|---|---|---|---|
| | C | Si | Mn | Cr | Ni | Mo | Co | Cu |
| *Electrode Wire | 0.03 | 0.87 | 1.79 | 21.14 | 9.73 | 3.15 | 3.04 | 1.60 |

* The diameter of wire; 2.0 mm.

Of course, no cracks were found in these three welded plates after welding.

The sub-zero cooling as employed in the present example will be explained referring to FIG. 2:
(1) is the base metal, (2) is a backing metal (3 × 20 mm), (4) is a weld coolant comprising a mixture of methyl alcohol and dry ice, and (5) is a stopper for the coolant.

As is clear from FIG. 2, the coolant is disposed on the surface of the base metal in such a manner that it completely covers and contacts the welded portion.

Each plate subjected to the above sub-zero cooling and after reaching room temperature was subsequently subjected to an aging treatment in air at a temperature of 400° to 450°C. for 60 minutes and thereafter allowed to cool to room temperature over a period of time of 60 minutes.

The effects of the sub-zero cooling and aging treatments will be explained in Table 4, which shows the results of tension tests on test pieces made of each welded metal cut from each welded part of the aforesaid four kinds of base metal (using an Amslar testing machine).

Table 4

| Test Piece No. | Temperature of Sub-zero Cooling (°C) | Tensile Strength (Kg/mm²) | Yield Strength (Kg/mm²) | Elongation (%) |
| --- | --- | --- | --- | --- |
| 1 | — | 117 | 25 | 13 |
| 2 | −20 | 125 | 65 | 22 |
| 3 | −50 | 128 | 69 | 11 |
| 4 | −70 | 130 | 80 | 6 |

From Table 4, it is clear that the samples subjected to the sub-zero cooling and aging treatments were remarkably excellent in yield strength of 0.2 percent and tensile strength compared to the sample not subjected to these treatments.

FIG. 4 is a graph for intelligibly comparing the test values of the respective test pieces shown in Table 3 (a being tensile strength, b being yield strength and c being elongation).

Incidentally, the test pieces used for the above tension tests were prepared by processing the aforesaid respective four kinds of welded metal pieces to the same shape as No. A-2 of the test piece for a tension test as stipulated in the Japanese Industrial Standard as shown in FIG. 5, each test piece being cut from position 7 shown by a dotted line in FIG. 3.

As is clear from the above example, the present invention has such an effect that the working efficiency can be highly increased in high speed welding. Moreover, an excellent welding effect in which the heat-affected zone possesses less of a tendency to crack can be obtained for high tension steel.

While the invention has been particularly shown and described with reference to preferred embodiments thereof, it will be understood by those skilled in the art that various changes in form and details may be made therein without departing from the spirit and scope of the invention.

What is claimed is:

1. A process for welding a high tension steel which comprises welding said steel with an electrode by which a metastable austenitic weld metal is obtained, and after welding, subjecting said welded steel to the steps of:
   a. sub-zero treatment at a temperature below 0°C. and for a period of time sufficient to transform said austenitic steel into a martensitic steel; and
   b. aging the resulting welded steel at a temperature and for a period of time sufficient to improve the tensile strength and yield of the product.

2. A process for welding a high tension steel which comprises welding said steel by the Metal-arc-Inert-Gas method employing a welding electrode by which a metastable austenitic steel weld metal is obtained and, within 20 to 320 minutes after welding, transforming said austenitic steel into a martensitic steel by subjecting the weld to a sub-zero treatment at a temperature of from −20° to −196°C. for a period of time to effect said transformation, and subsequently aging the resulting welded steel in air at a temperature of from 350° to 500°C. for a period of time sufficient to form a precipitation-hardened martensitic steel and thereby improve the tensile strength and yield strength of the product.

3. The process of claim 2, wherein said sub-zero treatment is conducted for a period of time of about one hour.

4. The process of claim 2, wherein said sub-zero treatment is conducted by contacting the entire welded portion with a coolant at a temperature of from −20° to −70°C.

5. The process of claim 2, wherein said welding electrode has a composition consisting essentially of, in weight percent, based on the weight of the entire electrode, 0.005 − 0.07 percent carbon, 0.2 − 0.9 percent silicon, 1.5 − 6.0 percent manganese, 14.0 − 26.0 percent chromium, 6.0 − 12.0 percent nickel, 1.3 − 3.5 percent molybdenum, 1.3 − 3.5 percent cobalt, and 1.3 − 1.8 percent copper, the balance being essentially iron.

6. The process of claim 2, wherein the temperature of said sub-zero treatment varies from −20° to −70°C.

7. The process of claim 2, wherein said sub-zero treatment is conducted for a period of time of from 10 to 320 minutes.

8. The process of claim 2, wherein said aging step is conducted for a period of time of from 30 to 120 minutes.

* * * * *

UNITED STATES PATENT OFFICE
CERTIFICATE OF CORRECTION

Patent No. 3,836,748     Dated September 17, 1974

Inventor(s) Kiyoshi Terai et al

It is certified that error appears in the above-identified patent and that said Letters Patent are hereby corrected as shown below:

IN THE HEADING:

The claimed Priority Data was omitted. Should read:

--May 15, 1970     Japan..........41512/70--

Signed and sealed this 19th day of November 1974.

(SEAL)
Attest:

McCOY M. GIBSON JR.
Attesting Officer

C. MARSHALL DANN
Commissioner of Patents